37-66 S
3/31/87 03 RE 32,382

United States Patent [19]
van den Elshout et al.

[11] E Patent Number: Re. 32,382
[45] Reissued Date of Patent: Mar. 31, 1987

[54] DIGGING WHEEL FOR A SUCTION DREDGER VESSEL

[75] Inventors: Johannes van den Elshout, Rotterdam; Jan Asselbergs, Krimpen, both of Netherlands

[73] Assignee: IHC Holland N.V., Papendrecht, Netherlands

[21] Appl. No.: 709,345

[22] Filed: Mar. 6, 1985

Related U.S. Patent Documents

Reissue of:
[64] Patent No.: 4,302,893
Issued: Dec. 1, 1981
Appl. No.: 142,045
Filed: Apr. 21, 1980

[30] Foreign Application Priority Data

Apr. 20, 1979 [NL] Netherlands ..... 7903124

[51] Int. Cl.[4] ..... E02F 3/92
[52] U.S. Cl. ..... 37/66; 37/189
[58] Field of Search ..... 37/66, 70, 64, 65, 67, 37/189, 190

[56] References Cited

U.S. PATENT DOCUMENTS

| | | | |
|---|---|---|---|
| 598,988 | 2/1898 | Heath | 37/66 |
| 660,956 | 10/1900 | Henderson | 37/66 |
| 757,173 | 4/1904 | Boschke | 37/70 |
| 777,180 | 12/1904 | Cantwell | 37/67 |
| 2,991,568 | 7/1961 | Smith | 37/66 |
| 3,476,498 | 11/1969 | Von Bolhar | 37/66 X |
| 3,823,495 | 7/1974 | Robertson | 37/66 |
| 4,242,814 | 1/1981 | Floks | 37/66 |

FOREIGN PATENT DOCUMENTS

| | | | |
|---|---|---|---|
| 697261 | 10/1940 | Fed. Rep. of Germany | 37/66 |
| 2907485 | 9/1979 | Fed. Rep. of Germany | 37/66 |
| 23441 | 6/1976 | Japan | 37/66 |
| 6412997 | 5/1965 | Netherlands | 37/66 |
| 1207355 | 9/1970 | United Kingdom | 37/66 |
| 546721 | 3/1977 | U.S.S.R. | 37/66 |

*Primary Examiner*—Clifford D. Crowder
*Attorney, Agent, or Firm*—Young & Thompson

[57] ABSTRACT

A digging wheel for a suction dredger vessel which digging wheel rotates about a horizontal axis and has at its circumference a plurality of closely spaced partly overlapping scoops while the suction mouth in the interior of the wheel has an extension which extends into the scoops and fits through the outlet of the scoops. The effective passage between the leading edge of a scoop and the outlet edge of a preceding scoop is smaller than the outlet and any further passage towards the pump is of the same or larger magnitude than the outlet of a scoop.

7 Claims, 7 Drawing Figures

DIGGING WHEEL FOR A SUCTION DREDGER VESSEL

Matter enclosed in heavy brackets [ ] appears in the original patent but forms no part of this reissue specification; matter printed in italics indicates the additions made by reissue.

The invention relates to a digging wheel for a suction dredger vessel, comprising a wheel rotatable about a horizontal axis and provided at its outer circumference with a series of digging scoops regularly distributed about its circumference each one being U-shaped in a radial cross section of the wheel with the legs joining the said circumference and with an inlet opening facing forwardly in the direction of rotation, said inlet opening being larger than the outlet opening of each scoop, the said outer circumference over its entire length length having a passage between the legs of the scoops which joins the suction mouth of a suction conduit extending into the wheel through a stationary side wall of the wheel, which suction mouth covers part of the circle of the wheel at the location of said passage.

Such a digging wheel is known from Dutch Pat. No. 57081. With this known digging wheel each digging scoop has an inlet opening which is larger than the outlet opening or open bottom due to which large lumps of sticky material may get stuck between the inner side walls of the digging scoops and remain there when passing the suction mouth.

The object of the invention is to provide a digging wheel which does not have these problems. According to the invention this is achieved in that the suction mouth at its upper edge has an extension extending through the passage at an angle against the direction of rotation and into the scoops and fitting into the outlet openings of said scoops.

The extension extending into the digging scoops not only breaks any accumulation within the scoops but also improves the suctional operation and this improvement is the better according as the profile of the extension more closely joins the profile of the outlet opening or open bottom of the digging scoops.

The more closely during operation said extension of the suction mouth and the outlet opening of a scoop approach each other the more effective becomes the suction in the digging.

As the digging scoops of a digging wheel normally operate in the area below the axis of rotation it is preferred that the outer end of the extension lies at the level of the axis of rotation of the wheel. The combined operation of the suction mouth and its extension, as described above thus operates where the area of operation of the digging wheel ends.

In the known digging wheel the digging scoops are at a large distance from each other. They have an inlet opening which is largely inclined with respect to the radius and an outlet which is almost radial. The interconnecting wall which at the outer tops interconnects inlet and outlet is perpendicular to the plane of the inlet opening and accordingly should push the released soil inwardly. If, however, with sticky material the scoop becomes clogged or if this is done by stones, said transporation no longer takes place because the passage at the outlet as well as at the passage towards the suction mouth is too small.

According to the invention the digging scoops now in circumferential direction may be placed in such a close overlapping relationship to each other that the inlet of each scoop by the outlet portion of each preceding scoop is reduced to an effective passage which is smaller than the outlet opening of each scoop. With this one achieves with great certainty that pieces of soil entering the scoops always leave them.

Said effective passage can be defined by the chip thickness which each scoop is able to cut with its leading edge and which can pass between said leading edge and the edge of the outlet of the preceding scoop. Said chip thickness then is defined by the distance at the location of the feet of the scoops between inlet edge and adjacent outlet edge of the scoops defining the inlet as well as by the transverse distance between the tops of the scoops.

Since one has also to deal with stones an excellent criterion for the dimensioning is to make the effective inlet opening so much smaller than the outlet opening that the largest ball which still can pass between an inlet edge of a scoop and an outlet edge of a preceding scoop always can pass the outlet of the scoops.

This accordingly means that what passes through the inlet can always escape through the outlet and that larger parts are refused and accordingly cannot get stuck.

Preferably the entire structure is made such that all passages counted from the inlet of the digging scoops through their outlet and the subsequent passage of the wheel up to and including the passage through the pump always are at least of the same magnitude or larger.

Instead of a small number of large scoops, as with the known digging wheel, it now is possible to arrange a large number of smaller scoops distributed over the circumference of the digging wheel which all can cut relatively small chips of soil which are discharged with certainty.

The extension of the suction mouth extending into the scoops now needs not or hardly to perform a breaking operation but highly increases the effect of the suction by more or less preventing the inflow of water from above.

If as usual operation takes place with the side face of the digging wheel then water can enter through the openings of the opposite side.

A simple embodiment of the digging wheel may be such that the scoops in radial cross section in principle are rectangular or trapezoidal and in tangential cross section are trapezoidal. Such a digging wheel can work with one or the other side with water always entering through the non-operative side. It, however, also is possible that the tangential cross section can have the shape of a rectangular trapezoid and that the right angle side of all scoops form a closed wall. Inflow of water from the side of the closed wall then cannot take place. Such a digging wheel is only operative at one side but one can easily double such a wheel by placing a mirror image one next to it and by placing a suction mouth in each one, which suction mouths at their connection with the suction conduit are provided with a valve.

The invention provides a digging wheel which no longer gets clogged and which can operate with high speed so that the speed of hauling can be increased.

The invention now will be further elucidated with reference to the drawings.

Figure 4:
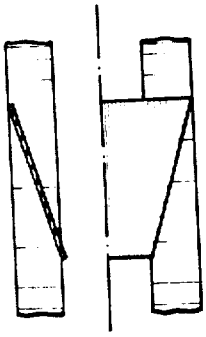

FIG. 4 a tangential cross section as well as partly end view of a digging scoop.

Figure 5:
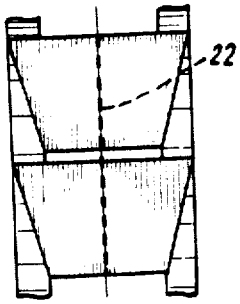

FIG. 5 diagrammatically indicates how the scoops can be made in another embodiment.

Figure 6:
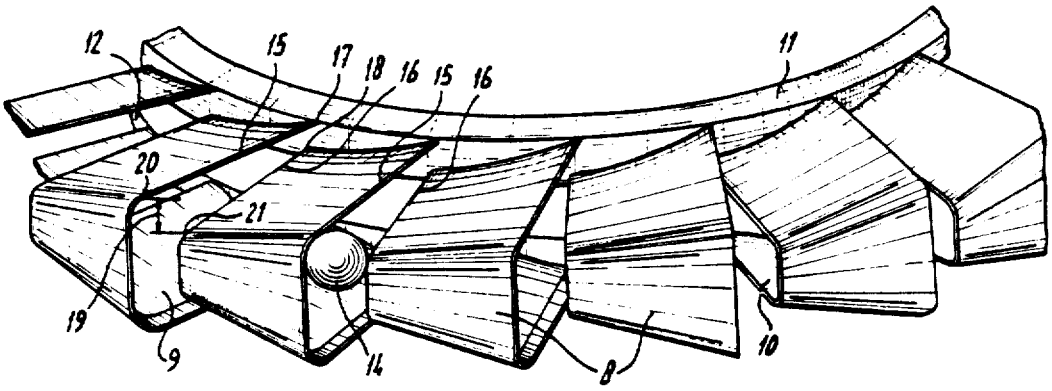

FIG. 6 shows in perspective part of a digging wheel to elucidate the principle of the passage.

Figure 3:
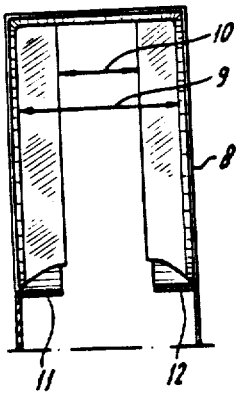
FIG. 3 shows a radial cross section of a digging scoop.
Figure 7:
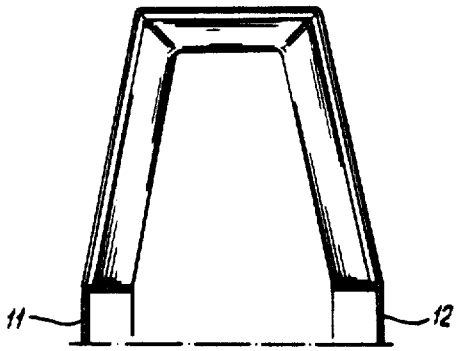

*FIG. 7 is a view similar to FIG. 3 but showing a radial cross section of a modified form of a digging scoop.*

Figure 1:
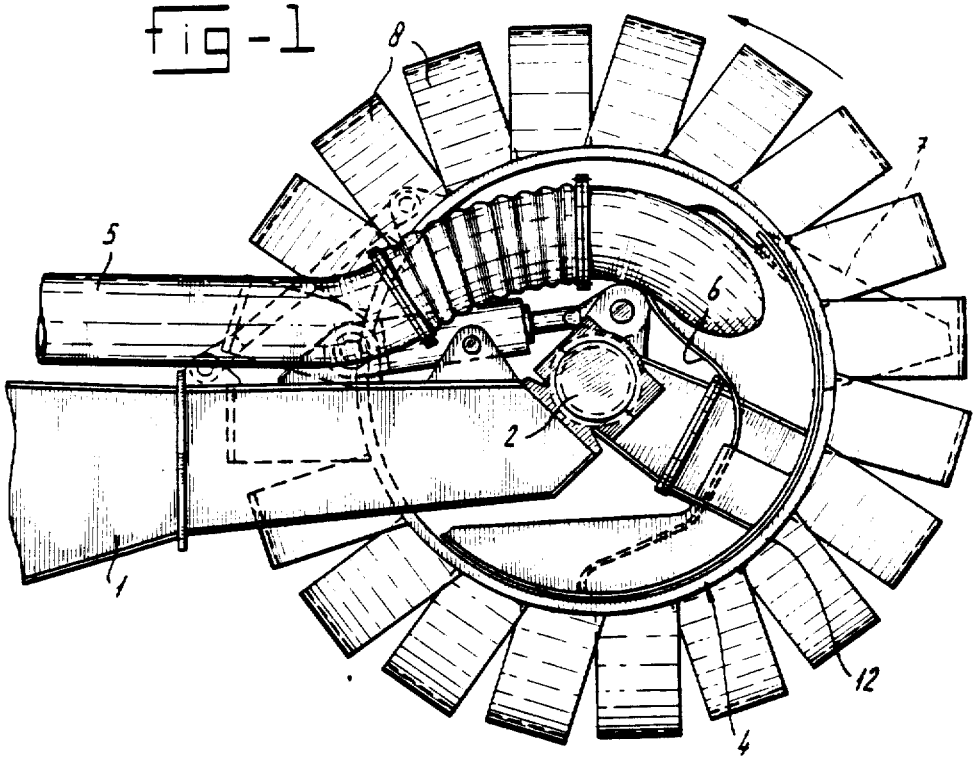
FIG. 1 shows a side view of the digging wheel according to the invention.
Figure 2:
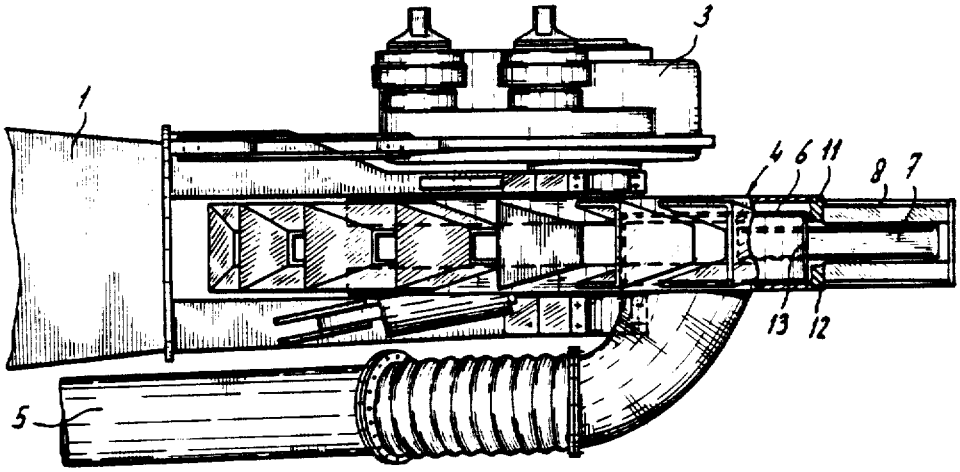
FIG. 2 is a top view of the digging wheel of FIG. 1 which at the right side partly is shown in cross section.

FIGS. 1 and 2 show an arm 1 with bearings 2 at the outer end, and a driving apparatus 3 for the digging wheel 4. Further a suction conduit 5 is shown which through a side wall extends into the interior of the wheel and there forms a suction mouth 6, which covers part of the inner circumference of the wheel. Said suction mouth has an extension 7 which from the upper edge extends into the digging scoops 8 provided at the circumference of the wheel, the form of said extension as shown in FIG. 2 being such that it passes through the outlet openings of the scoops 8.

The digging scoops 8 are closely distributed over the circumference and overlap each other somewhat with their feet. They have a rectangular cross section in radial direction as shown in FIGS. 2 and 3, *or a trapezoidal cross section in radial direction as shown in FIG. 7,* and an end view which is trapezoidal. They accordingly form a large rectangular inlet opening 9 and a much smaller outlet opening 10 and they are placed upon the edges 11 and 12 of the outer circumference of the wheel an opening 13 being formed between said edges, through which extends the extension 7 of the suction mouth.

Due to the close arrangement of the scoops and their partly overlapping each other the area of each inlet opening 9 is reduced by the outlet portion of a preceding scoop and this reduction is such that the effective passage is smaller at the inlet side than at the outlet.

FIG. 6 shows a number of digging scoops in perspective view. At 14 the largest ball has been indicated which still can pass between the edge 15 of the inlet of a scoop and the edge 16 of of an outlet.

At the left side of FIG. 6 another form of defining the passage has been indicated as well. The edges 15 and 16 at their bases have a distance between the points 17 and 18, which defines the maximum thickness of the chip at the level of the foot.

At the tops a distance is present indicated at 19 between the top 20 of the inlet edge 15 and the top 21 of the outlet edge 16.

FIG. 5 shows digging scoops which in tangential cross section have the form of a right angled trapezoid. The right angle side 22 of subsequent scoops forms a closed wall.

At both sides of said wall similar digging scoops are provided so that the digging wheel again can be used with both sides.

Such a digging wheel will have two suction conduits one at each side of the digging wheel, which alternatively can be put into operation.

We claim:

1. [In a] *A* digging wheel for a suction dredger vessel, said wheel being rotatable about a horizontal axis and having at its outer circumference a series of digging scoops regularly distributed about its circumference each one being U-shaped in a radial cross section of the wheel with the legs of the U secured to the said circumference and with an inlet opening facing forwardly in the direction of rotation *and an outlet opening facing rearwardly from the direction of rotation,* said inlet opening being larger than the outlet opening of each scoop, *the scoops being forwardly outwardly flared in a direction circumferentially of the wheel, the scoops in said circumferential direction being in such a close overlapping relationship with each other that the inlet of each scoop by the outlet portion of each preceding scoop is reduced to an effective passage which is smaller than the outlet opening of each scoop,* the said outer circumference over its entire length having a passage between the legs of the scoops which communicates with the suction mouth of a suction conduit extending into the wheel through a stationary side wall of the wheel, which suction mouth covers part of the circle of the wheel along said passage[; the improvement in which] the suction mouth [has] *having* an extension extending through [the] *said* passage into the scoops and fitting into the outlet openings of said scoops and opening in a direction opposite the direction of rotation of the wheel, *said extension being disposed at the end of the suction mouth toward which the scoops move, said suction conduit opening through said side wall of the wheel at the same said end of the suction mouth.*

2. Digging wheel according to claim 1, in which the outer end of the extension is at the level of the axis of rotation of the wheel.

[3. Digging wheel according to claim 1, in which the digging scoops in circumferential direction are in such a close overlapping relationship with each other that the inlet of each scoop by the outlet portion of each preceding scoop is reduced to an effective passage which is smaller than the outlet opening of each scoop.]

4. Digging wheel according to claim [3] *1,* in which the effective inlet opening is smaller than the outlet opening to an extent such that the largest ball which still can pass between an inlet edge of a scoop and an outlet edge of a preceding scoop always can pass the outlet of the scoops.

5. Digging wheel according to claim 2, in which all passages counted from the inlet of the digging scoops through their outlet and the subsequent passage of the wheel up to and including the passage through the pump always are at least of the same size.

6. Digging wheel according to claim 1, in which the scoops in radial cross section in principle are rectangular [or trapezoidal] and in tangential cross section are trapezoidal.

7. Digging wheel according to claim 6, characterized in that the tangential cross section has the shape of a right angled trapezoid and that the right angle side of all scoops forms a closed wall.

8. Digging wheel according to claim 1, in which the scoops in radial cross section and in tangential cross section are substantially trapezoidal.

* * * * *